(12) United States Patent
You et al.

(10) Patent No.: US 12,503,014 B2
(45) Date of Patent: Dec. 23, 2025

(54) REAR SEAT FOR VEHICLE

(71) Applicants: Hyundai Motor Company, Seoul (KR); Kia Corporation, Seoul (KR); Hyundai Transys Inc., Chungcheongnam-Do (KR)

(72) Inventors: Jung Sang You, Gyeonggi-do (KR); Han Su Yoo, Gyeonggi-do (KR); Guk Mu Park, Seoul (KR); Dong Woo Jeong, Gyeonggi-do (KR); Myung Hoe Kim, Seoul (KR); Eun Sue Kim, Gyeonggi-do (KR); Dae Hee Lee, Incheon (KR); Jae Hoon Cho, Gyeonggi-do (KR); Han Kyung Park, Gyeonggi-do (KR); Jae Sung Shin, Gyeonggi-do (KR); Hae Dong Kwak, Gyeonggi-do (KR); Gwon Hwa Bok, Gyeonggi-do (KR); Jun Sik Hwang, Gyeonggi-do (KR)

(73) Assignees: Hyundai Motor Company, Seoul (KR); Kia Corporation, Seoul (KR); Hyundai Transys Inc., Chungcheongnam-Do (KR)

( * ) Notice: Subject to any disclaimer, the term of this patent is extended or adjusted under 35 U.S.C. 154(b) by 410 days.

(21) Appl. No.: 18/074,967

(22) Filed: Dec. 5, 2022

(65) Prior Publication Data
US 2024/0025306 A1  Jan. 25, 2024

(30) Foreign Application Priority Data
Jul. 20, 2022 (KR) .................. 10-2022-0089627

(51) Int. Cl.
*B60N 2/06* (2006.01)
*B60N 2/01* (2006.01)
(Continued)

(52) U.S. Cl.
CPC .............. *B60N 2/065* (2013.01); *B60N 2/01* (2013.01); *B60N 2/206* (2013.01); *B60N 2/3065* (2013.01); *B60N 2/68* (2013.01); *B60N 2205/35* (2013.01)

(58) Field of Classification Search
CPC ... B60N 2/065; B60N 2205/35; B60N 2/3056
See application file for complete search history.

(56) References Cited

U.S. PATENT DOCUMENTS 6,827,388 B2 * 12/2004 Kayumi ................. B60N 3/10
  296/65.13
7,380,859 B2 *  6/2008 Gardiner ............... B60N 2/01
  296/65.13
(Continued)

FOREIGN PATENT DOCUMENTS

CN    104723906 A *  6/2015 ............. B60N 2/012
EP    1457380 A1  *  9/2004 ............. B60N 2/12
(Continued)

*Primary Examiner* — Timothy J Brindley
(74) *Attorney, Agent, or Firm* — Fox Rothschild LLP (57) ABSTRACT

A rear seat for a vehicle is provided. The rear seat for a vehicle includes a center seat, and side seats located at left and right of the center seat, and the center seat is movable forward with respect to the side seats to protrude forward, and when the center seat protrudes forward, an interval between passenger is widened, so that it is possible to prevent physical contact between a passenger on the center seat and a passenger on each of the side seats as much as possible.

21 Claims, 10 Drawing Sheets

(51) Int. Cl.
   *B60N 2/20* (2006.01)
   *B60N 2/30* (2006.01)
   *B60N 2/68* (2006.01)

(56) References Cited

U.S. PATENT DOCUMENTS

| | | | |
|---|---|---|---|
| 7,980,618 | B2 | 7/2011 | Kato et al. |
| 8,215,695 | B2 * | 7/2012 | Ida ................... B60N 2/01583 |
| | | | 297/316 |
| 8,702,146 | B1 * | 4/2014 | Mather ............... B60N 2/3075 |
| | | | 296/65.01 |
| 8,833,853 | B2 * | 9/2014 | Kim .................... B60N 2/2362 |
| | | | 297/316 |
| 9,168,850 | B2 | 10/2015 | Meszaros et al. |
| 10,189,378 | B2 * | 1/2019 | Jackson ............... B60N 2/3097 |
| 10,457,170 | B2 * | 10/2019 | Line ..................... B60N 3/004 |
| 11,001,172 | B2 | 5/2021 | Cluet et al. |
| 11,541,784 | B2 * | 1/2023 | Powell ..................... B60N 2/32 |
| 2003/0098592 | A1 * | 5/2003 | Nygren ................ B60N 2/3056 |
| | | | 296/65.09 |
| 2009/0072572 | A1 * | 3/2009 | Scheinberg ........... B60N 2/206 |
| | | | 296/64 |
| 2012/0049589 | A1 * | 3/2012 | Kyogoku .............. B60N 2/206 |
| | | | 297/219.1 |
| 2017/0305306 | A1 * | 10/2017 | Park ...................... B60N 2/065 |
| 2019/0106024 | A1 * | 4/2019 | Wellborn ............. B60N 2/0021 |
| 2019/0232839 | A1 * | 8/2019 | Welch .................. B60N 2/3056 |
| 2024/0067056 | A1 * | 2/2024 | You ........................ B60N 2/309 |

FOREIGN PATENT DOCUMENTS

| | | | | |
|---|---|---|---|---|
| GB | 2404141 A | * | 1/2005 | ............ B60N 2/062 |
| GB | 2502862 A | * | 12/2013 | ............... B60N 2/06 |
| KR | 10-2002-0090663 A | | 12/2002 | |

* cited by examiner

REAR SEAT FOR VEHICLE

CROSS REFERENCE TO RELATED APPLICATION

The present application claims under 35 U.S.C. § 119(a) the benefit of Korean Patent Application No. 10-2022-0089627, filed Jul. 20, 2022, the entire contents of which is incorporated herein for all purposes by this reference.

BACKGROUND

Technical Field

The present disclosure relates generally to a rear seat for a vehicle and, more particularly, to a rear seat for a vehicle, wherein a center seat among triple rear seats is configured to protrude forward.

Background

Vehicles are equipped with seats for passengers, and a seat of a vehicle includes a seat cushion supporting the lower body of a passenger, a seat back supporting the upper body, and a headrest supporting the head.

In general, a case of a passenger vehicle, a rear seat consists of triple seats, and each of the triple seats includes seat backs and seat cushions that are integrated for 3 passengers can use the vehicle at the same time.

Therefore, in the triple rear seats, a passenger on a center seat has a problem in that an interval between the passenger and left and right passengers, so that it is difficult to sit in a comfortable state due to shoulder bumps between passengers.

The foregoing is intended merely to aid in the understanding of the background of the present disclosure, and is not intended to mean that the present disclosure falls within the purview of the related art that is already known to those skilled in the art.

SUMMARY

The present disclosure is a rear seat for a vehicle including a structure in which a center seat among triple rear seats for a vehicle is movable forward, and the present disclosure is intended to induce a comfortable seating condition of rear passengers, such that the center seat moves and protrudes forward when necessary so as to increase an interval between the passengers and to prevent physical contact between the passengers on the center seat and side seats as much as possible.

In one aspect, a rear seat for a vehicle is provided, the rear seat comprising: a center seat, and a side seat located at left and right of the center seat, wherein the center seat is configured to be movable (e.g. longitudinally and/or backwards/forwards) with respect to the side seats by operation of a link device connecting a center seat cushion frame of the center seat to each of side seat cushion frames of the side seats. In certain embodiments, when the center seat moves forward, the center seat protrudes forward with respect to the side seats.

In order to achieve the above objective, according to one aspect of the present disclosure, there is provided a rear seat for a vehicle, the rear seat including: a center seat and side seats located at left and right of the center seat, wherein the center seat may be configured to be movable backwards and forwards with respect to the side seats by operation of a link device connecting a center seat cushion frame of the center seat to each of side seat cushion frames of the side seats; and when the center seat moves forward, the center seat may protrude forward with respect to the side seats.

The link device may include a first link and a second link, and each of the first link and the second link may have opposite ends respectively coupled to the center seat cushion frame and each of the side seat cushion frames in a rotatable hinge structure.

The first link and the second link may be composed of a pair of first links and a pair of second links, and the pair of first links and the pair of second links may be provided to connect left and right surfaces of the center seat cushion frame to the side seat cushion frames.

The first link and the second link may be spaced apart from each other and provided in parallel to each other. The first link and the second link may be longitudinally spaced apart from each other and provided in parallel to each other.

The rear seat may include: latches provided at the center seat cushion frame; and strikers provided at the side seat cushion frames and coupled to the latches, wherein when the latches and each of the strikers are coupled to each other, back and forth movement of the center seat may be impossible, and when coupling between the latches and each of the strikers is released, back and forth movement of the center seat may be possible.

The latches may include two latches and the two latches may be respectively located at left and right portions of the center seat cushion frame, and the two latches may be configured to be simultaneously operated.

The strikers may include a front striker and a rear striker, which may be transversally extended below the latches and connected to the side seat cushion frames; and the front striker and the rear striker may be spaced apart from each other and provided in parallel to each other. The front striker and the rear striker may be spaced apart from each other When the latches are coupled to the front striker, the center seat may move and protrude forward with respect to the side seats.

When the latches are coupled to the rear striker, the center seat may be prevented from protruding with respect to the side seats and be arranged on the same line as the side seats.

The rear seat may include: a lever bracket fixed to the side seat cushion frames and an operating lever rotatably coupled to the lever bracket; and a latch cable of which a first end may be connected to the operating lever and second ends may be connected to the two latches, wherein when the operating lever rotates, the latch cable is pulled or relaxed, so that the latches may be operated.

A strap may be coupled to the operating lever so that a user may pull the strap to rotate the operating lever.

The rear seat may include a lever spring of which opposite ends may be respectively coupled to the lever bracket and the operating lever to supply a restoration force to the operating lever.

When the latch cable is pulled by rotation of the operating lever, locking between the latches and each of the strikers may be released, and in releasing the locking, the center seat may be movable backwards and forwards with respect to the side seats.

A cushion part and a back part of the center seat may be connected to each other by a recliner as a medium, and longitudinal angle adjustment of the back part may be possible by operation of the recliner.

The operation of the recliner may be performed by operating a recliner lever, and the recliner lever may protrude forward from the center seat.

The back part of the center seat may rotate forward in operation of the recliner to be folded; and when the back part of the center seat is folded, passengers on the side seats may use the folded back part as an armrest.

The back part may include a cup holder that may be exposed upward when the back part is folded.

As described above, according to the present disclosure, the rear seat for a vehicle is seats for 3 passengers by using the center seat and the side seats located at left and right of the center seat, and the center seat is configured to move and protrude forward with respect to the side seats, and when the center seat protrudes forward, a distance between the passengers can increases, so that physical contact between the passenger on the center seat and the passengers on the side seats can be prevented as much as possible, and the comfortable seating condition of the rear passengers can be induced.

Furthermore, according to the present disclosure, the rear seat for a vehicle is configured such that the back part of the center seat is adjustable in longitudinal angle by operation of the recliner, the forward folded back part is usable as an armrest, and the cup holder is provided on the folded back part, so that the passengers on the side seats can be provided a comfortable ride quality.

In another embodiment, vehicles are provided that comprise an apparatus as disclosed herein.

DETAILED DESCRIPTION

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are given or mixed in consideration of only the ease of writing the specification, and do not have distinct meanings or roles by themselves.

In the following description, if it is decided that the detailed description of known function or configuration related to the disclosure makes the subject matter of the disclosure unclear, the detailed description is omitted.

Furthermore, the accompanying drawings are only for understanding of the preferred embodiments of the present disclosure, and the technical ideas disclosed in the specification are not limited by the accompanying drawings, and those skilled in the art will appreciate that various modifications, additions and substitutions are possible, without departing from the scope and spirit of the disclosure as disclosed in the accompanying claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween.

On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that controls a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Hereinbelow, a rear seat for a vehicle according to a preferred embodiment of the present disclosure will be described with reference to accompanying drawings.

According to the present disclosure, as shown in FIGS. 1 to 10, the rear seat for a vehicle may be a triple seat including a center seat 10 and side seats 20 located at left and right of the center seat 10. The center seat 10 may be separately provided from the side seats 20 and the center seat 10 may be movable forward and rearward with respect to the side seats 20, and when the center seat 10 moves forward, the center seat 10 comes into a forward protruding state with respect to the side seats 20.

In other words, the embodiment according to the present disclosure is rear seats for three occupants, and is configured to allow the center seat 10 among the rear seats to move forward to protrude forward with respect to the side seats 20, and to allow the forward protruding center seat 10 to move rearward to be restored to an initial position. In the forward protruding state of the center seat 10, an interval between occupants may increase, so that it is possible to prevent physical contact between an occupant on the center seat 10 and occupants on the side seats 20 as much as possible, and thus a comfortable seating state of a rear occupant can be induced.

The center seat 10 may include a center seat back frame 110 and a center seat cushion frame 120 as the frame, and each of the side seats 20 may include a side seat back frame 210 and a side seat cushion frame 220 as the frame.

According to the embodiment of the present disclosure, the center seat cushion frame 120 and the side seat cushion frame 220 may be connected to each other by a link device 300 as a medium, and the center seat 10 may be movable backwards and forwards with respect to the side seats 20 when the link device 300 rotates.

The center seat back frame 110 may be located at an intermediate position between opposite side seat back frames 210, and the center seat cushion frame 120 may be placed on an intermediate position between opposite side seat cushion frames 220 and the center seat cushion frame and the side seat cushion frames may be connected to each other by the link device 300.

The link device 300 may include a first link 310 and a second link 320. Opposite ends of each of the first and second links 310 and 320 are respectively coupled to the center seat cushion frame 120 and each of the side seat cushion frames 220 in a rotatable hinge structure.

For back and forth movement of the center seat 10, the center seat cushion frame 120 and each of the side seat cushion frames 220 may be connected to each other by the first link 310 and the second link 320.

The first link 310 and the second link 320 may be respectively composed of a pair of first links 310 and a pair of second links 320. The first links 310 and the second links 320 are provided to respectively connect left and right surfaces of the center seat cushion frame 120 to the opposite side seat cushion frames 220.

As the two first link 310 and the two second link 320 are provided to connect the left and right surfaces of the center seat cushion frame 120 to the side seat cushion frames, the center seat 10 may be movable backwards and forwards with more stable condition.

Each of the first links 310 and each of the second links 320 may be spaced apart from each other and are arranged in parallel to each other, and an upper end of each of the first links 310 and an upper end of each of the second links 320 may be coupled to the center seat cushion frame 120 in the rotatable hinge structure, and a lower end of each of the first links 310 and a lower end of each of the second links 320 may be respectively coupled to the side seat cushion frames 220 in the rotatable hinge structure.

The center seat cushion frame 120 and the side seat cushion frames 220, and the first link 310 and the second link 320 may have a 4-joint link structure.

When the center seat 10 moves back and forth, the side seat cushion frame 220 of the 4-joint link structure serves as a fixed part without changing position, and the first link 310 and the second link 320 may serve as links rotating on the lower hinges coupled to the side seat cushion frames 220, and the center seat cushion frame 120 may serve as a moving part moving back and forth when the first and second links 310 and 320 rotate.

The center seat cushion frame 120 may include latches 410 fixed thereto, and the side seat cushion frames 220 may include strikers 420 coupled to the latches 410. The latches 410 may be coupled to each of the strikers 420 or coupling therebetween is removed by operation of the latches 410.

When the latches 410 are coupled to the strikers 420, back and forth movement of the center seat is impossible, and when coupling between the latches 410 and the strikers 420 is removed, at this point, the center seat 10 may be movable backwards and forwards with respect to the side seats 20 by using the link device 300.

The latches 410 may include two latches, and the two latches 410 may be respectively provided at left and right portions of the center seat cushion frame 120 and simultaneously operated.

The two latches 410 are provided, when the two latches 410 are coupled to each of the strikers 420, the center seat 10 may maintain a stable fixed state.

The strikers 420 may include a front striker 421 and a rear striker 422, which are transversally extended below the two latches 410.

The front striker 421 and the rear striker 422 may be longitudinally spaced apart from each other and arranged in parallel to each other. Opposite ends of each of the front and rear strikers are connected to the side seat cushion frames 220.

Figure 6:
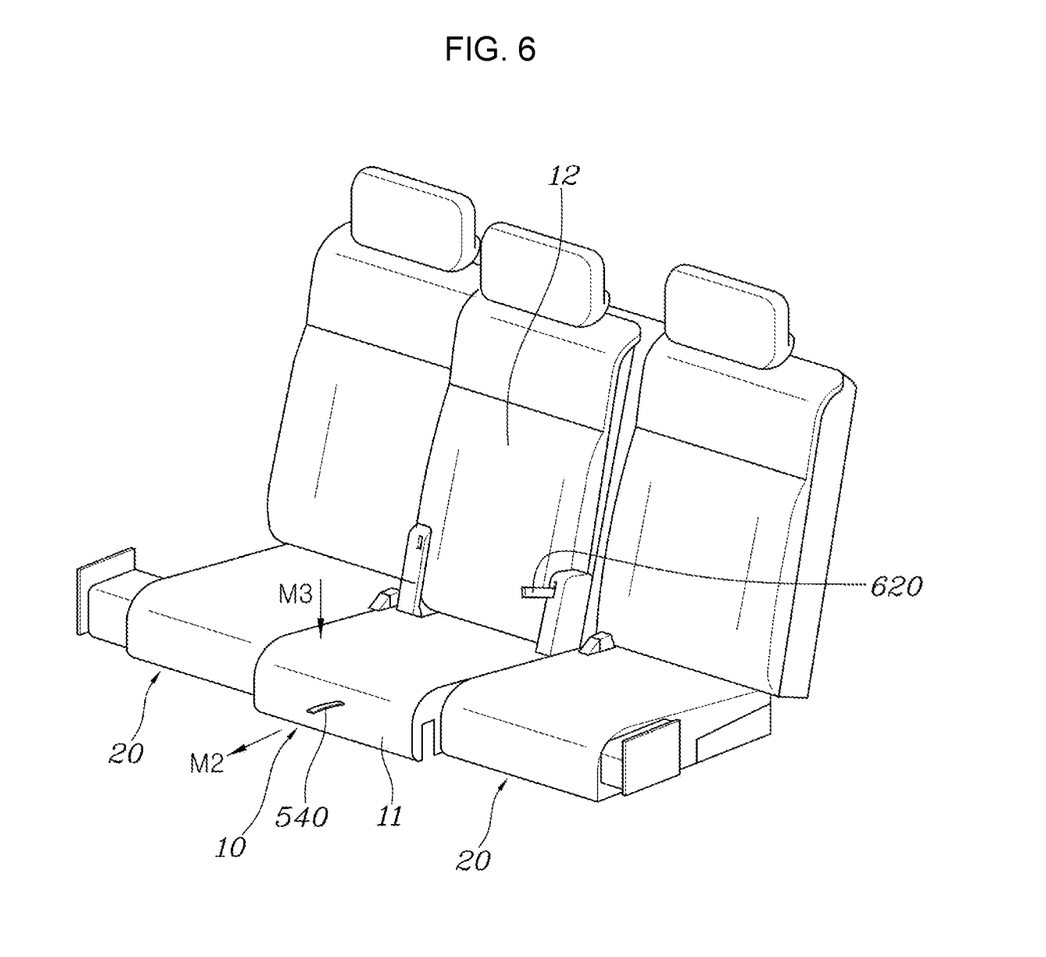
Figure 7:
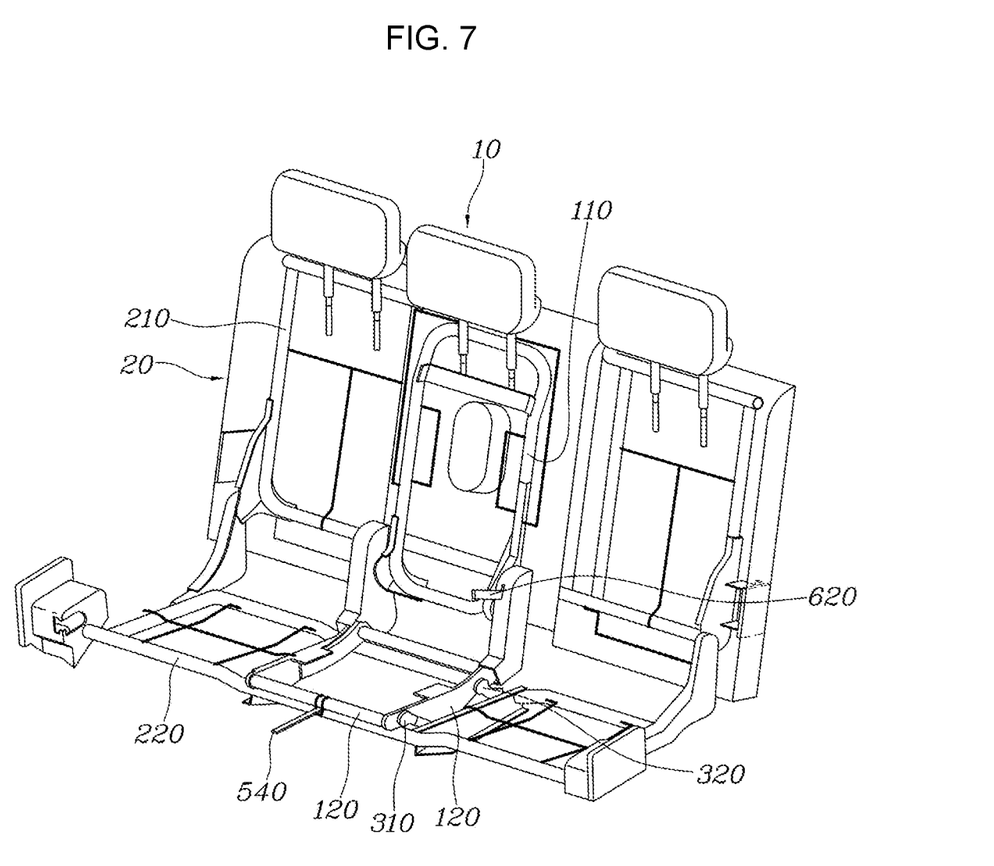
Figure 8:
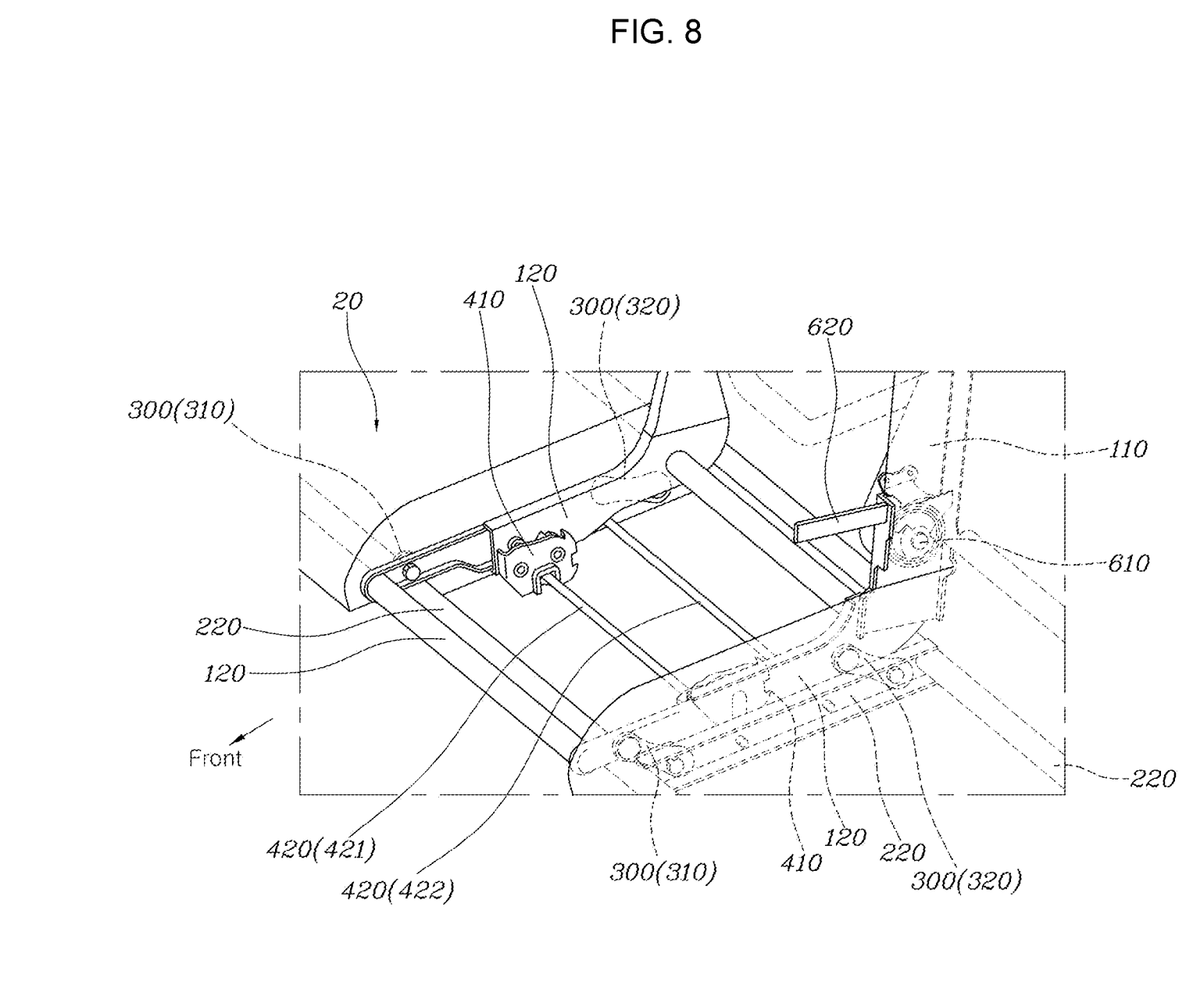
Figure 9:
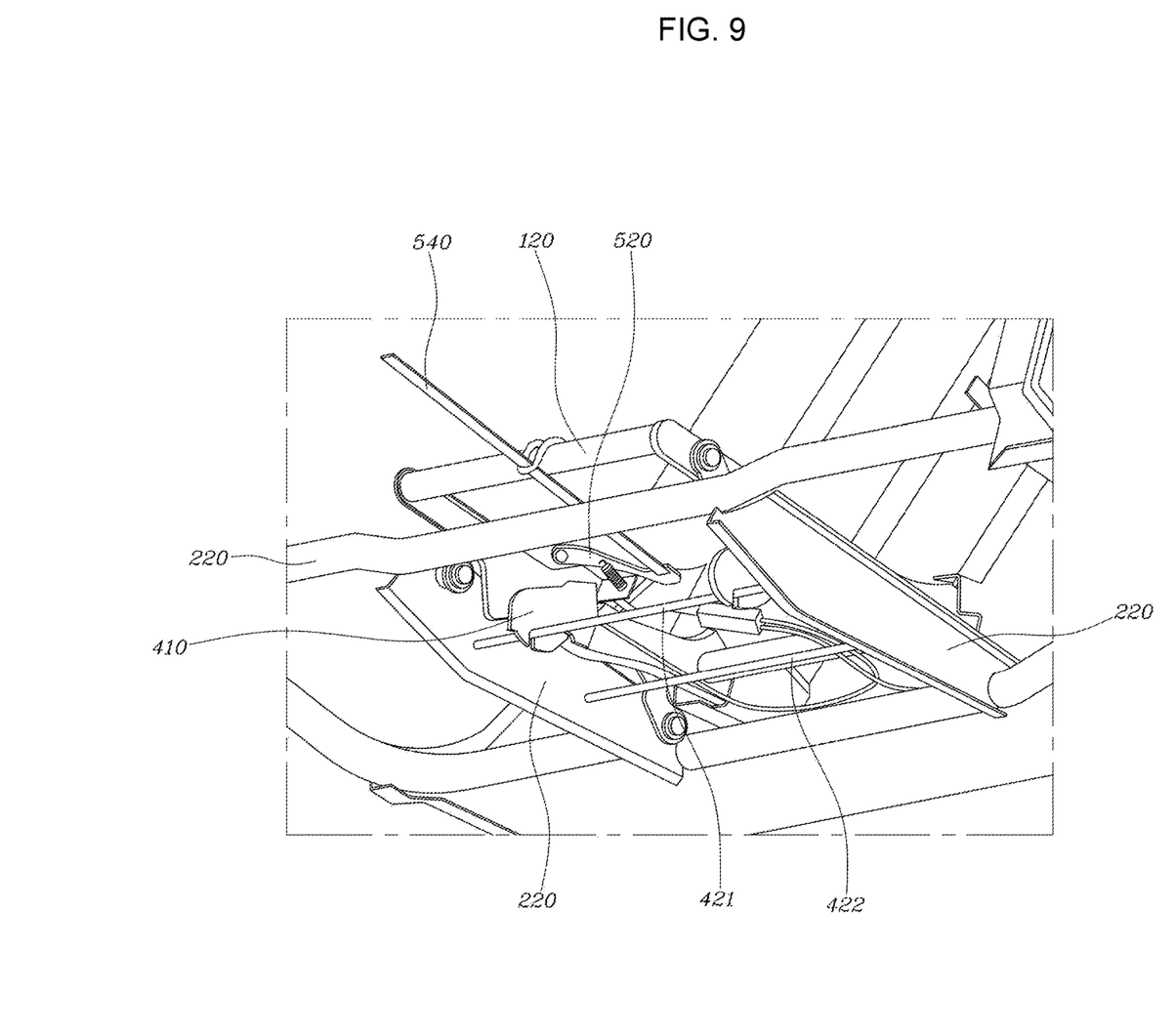

As show in FIGS. 8 and 9, when the two latches 410 are coupled to the front striker 421, the center seat 10 may move forward and protrudes with respect to the side seats 20 as shown in FIGS. 6 and 7.

Figure 1:
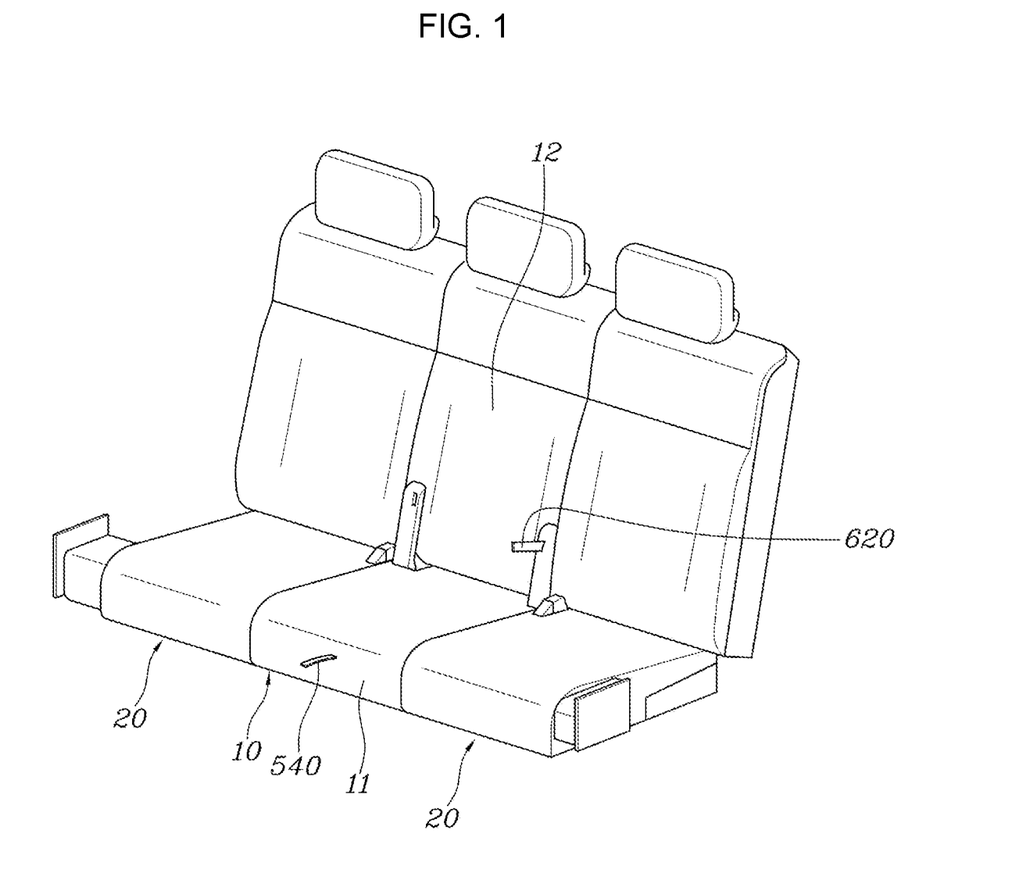
FIG. 1 is a perspective view showing the rear seat for a vehicle according to the present disclosure.
Figure 2:
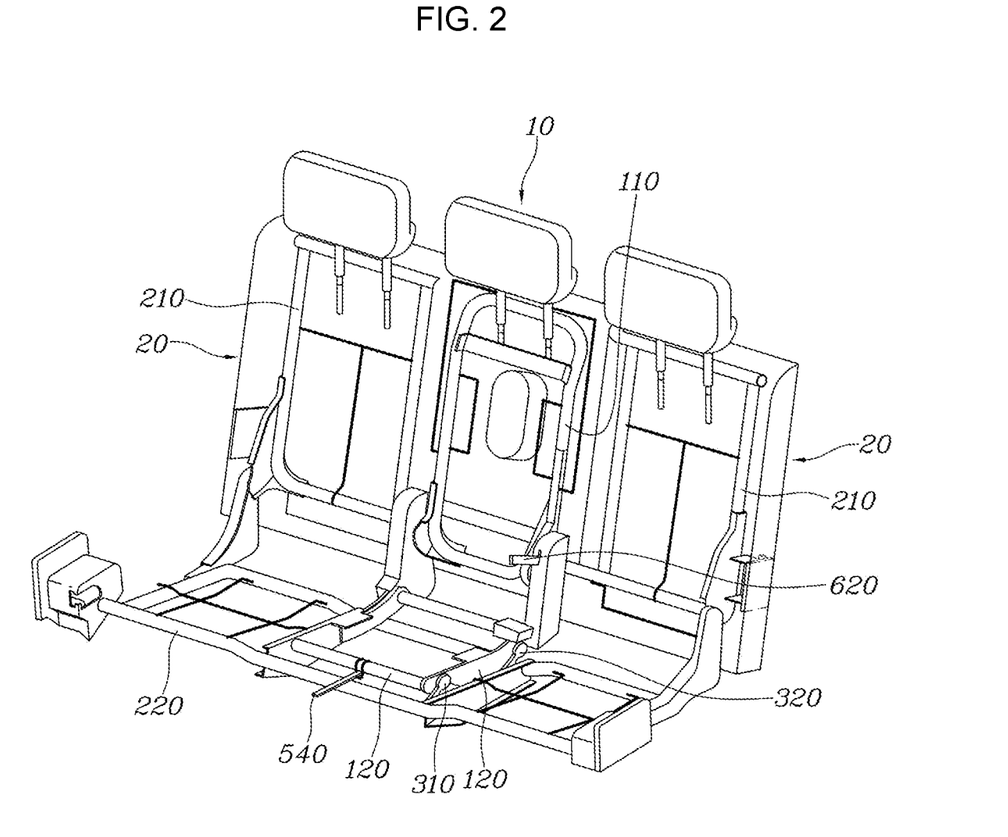
FIG. 2 is a view showing a frame structure in FIG. 1.
Figure 3:
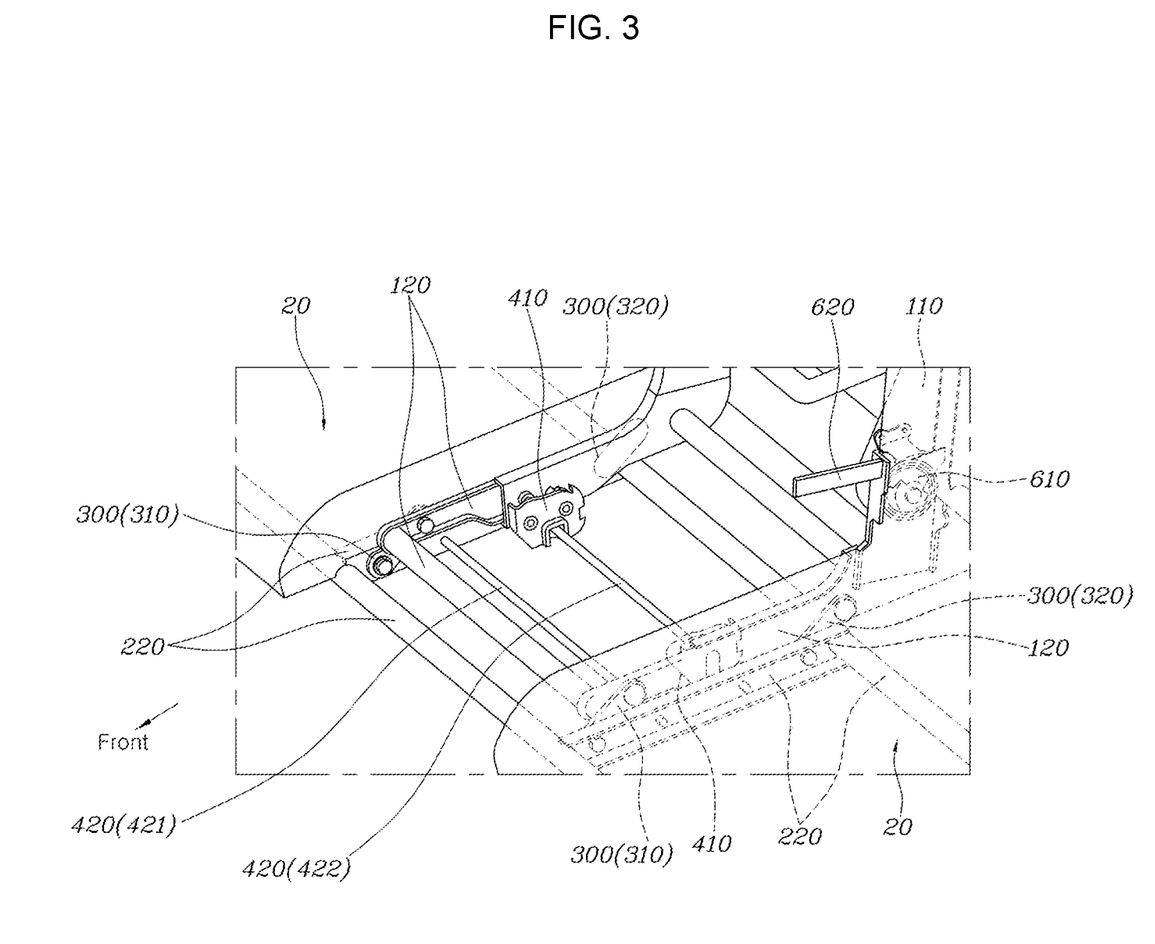
FIGS. 3 and 4 are views showing a coupling state between latches and a rear striker in FIG. 2.
Figure 4:
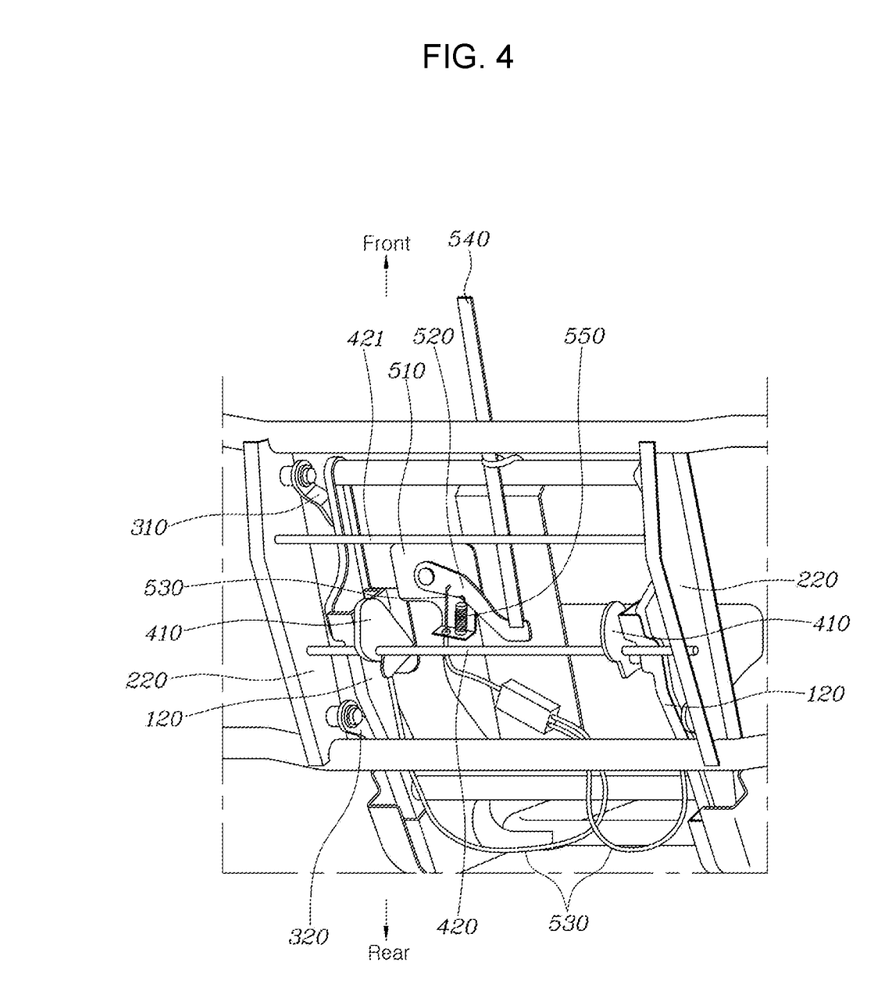

Then, as shown in FIGS. 3 and 4, when the two latches 410 are coupled to the rear striker 422, the center seat 10 may not protrude forward with respect to the side seats 20 and may be arranged on the same line as the side seats 20 as shown in FIGS. 1 and 2.

A lever bracket 510 may be fixed to the side seat cushion frames 220, and the lever bracket 510 may be located below a cushion part 11 of the center seat 10, and one end of an operating lever 520 may be rotatably coupled to the lever bracket 510 by a lever pin as a medium.

A first end of a latch cable 530 may be connected to the operating lever 520, and second ends of the latch cable 530 are simultaneously connected to the two latches 410.

Therefore, when the operating lever 520 rotates, the latch cable 530 may be pulled or relaxed, so that the two latches 410 are simultaneously operated.

Furthermore, the operating lever 520 may be coupled to a strap 540. The strap 540 protrudes forward from the cushion part 11 of the center seat 10, and a user grabs and pulls the strap 540 protruding in front of the cushion part 11, thereby rotating the operating lever 520.

According to the embodiment of the present disclosure, a lever spring 550 may be provided to connect the lever bracket 510 to the operating lever 520.

When the user grabs and pulls forward the strap 540, the operating lever 520 may rotate, and when the operating lever 520 rotates, the lever spring 550 may be tensioned to accumulate an elastic force. When the user releases the pulled strap 540, the tensioned lever spring 550 is restored in shape, and at this point, the operating lever 520 is supplied with a restoration force by the accumulated elastic force, so that the operating lever 520 is restored to an initial position.

FIGS. 1 to 4 are views showing the center seat 10 not protruding forward with respect to the side seats 20 and arranged in the same line as the side seats 20, and at this point, the latches 410 provided at the center seat cushion frame 120 are coupled to the rear striker 422.

When the user grabs and pulls forward the strap 540 in the above state, the operating lever 520 may rotate, and the latch cable 530 may be pulled by rotation of the operating lever 520, and when the latch cable 530 is pulled, locking between the latches 410 and the rear striker 422 may be released.

When locking of the latches 410 is released, at this point, the center seat 10 may be movable backwards and forwards with respect to the side seats 20.

Figure 5:
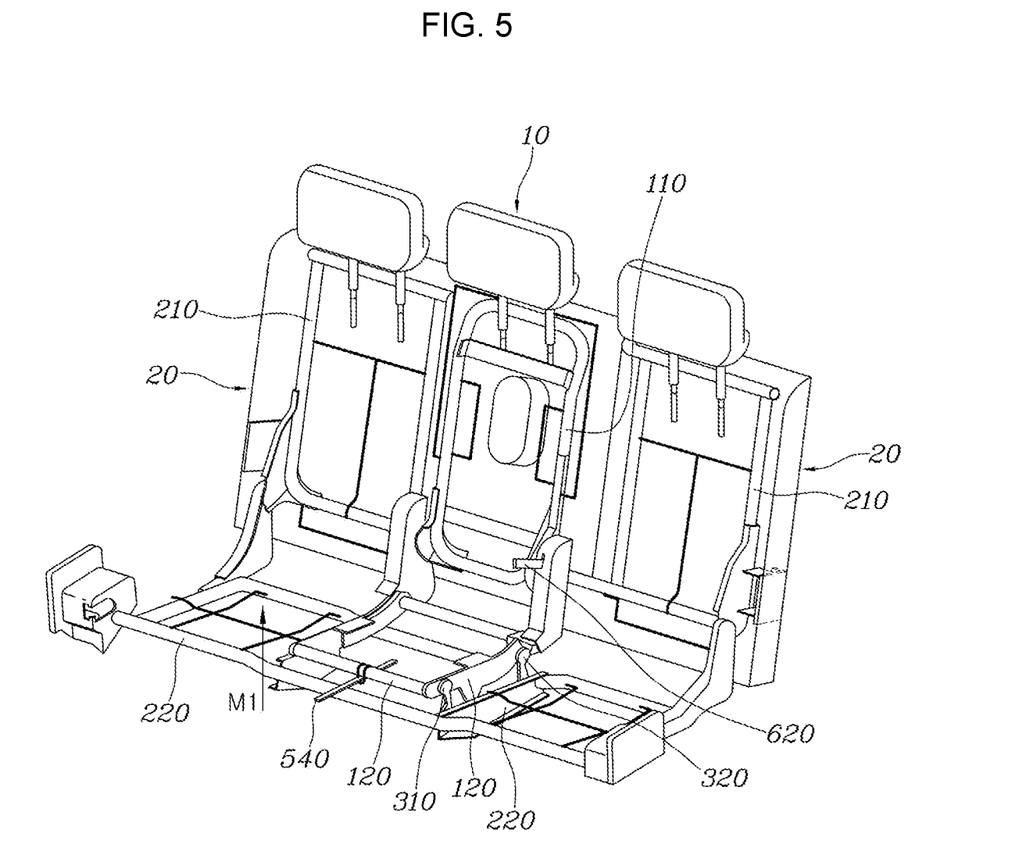
FIGS. 5 to 9 are view showing operation in which a center seat moves forward and protrude according to the present disclosure.

In other words, when locking between the latches 410 and the rear striker 422 is released, the user may lift up the cushion part 11 of the center seat 10 and, at this point, the center seat cushion frame 120 may move upward along arrow M1 in FIG. 5 by rotation of the first, second link 310, 320 and, simultaneously, the latches 410 may be separated from the rear striker 422 and may move upward to be in a separated state.

In FIG. 5, when the user grabs the strap 540 and pulls forward the cushion part 11 of the center seat 10 in a direction of arrow M2 in FIG. 6, the center seat 10 may move forward and protrude forward than the side seats 20 by rotation of the first, second link 310, 320.

When forward movement of the center seat 10 is completed, the latches 410 provided at the center seat cushion frame 120 may be located above the front striker 421.

In the state in which the cushion part 11 of the center seat 10 moves forward and protrude forward, when the user presses and rotates downward the cushion part 11 of the center seat 10 in a direction of arrow M3 in FIG. 6, the latches 410 provided at the center seat cushion frame 120 may be coupled to the front striker 421 as shown in FIGS. 8 and 9 and maintain the locked state, and the center seat 10 may be fixed not to be movable.

An operation in which the center seat 10 moving forward and protruding moves rearward again to be restored into the initial position can be performed by performing the above-described operation in reverse order, and the description thereof will be omitted.

According to the embodiment of the present disclosure, a recliner 610 may be coupled to a portion of the center seat 10 where the cushion part 11 and a back part 12 are connected to each other. The back part 12 may rotate longitudinally by operation of the recliner 610, so that the back part 12 can be adjusted in longitudinal angle, and a passenger of the center seat 10 can be provided a comfortable ride quality with the angle-adjustable back part 12.

Operation of the recliner 610 may be performed by operating a recliner lever 620, and the recliner lever 620 protrudes forward from the center seat 10 so that the passenger can operate easily the recliner lever.

Figure 10:
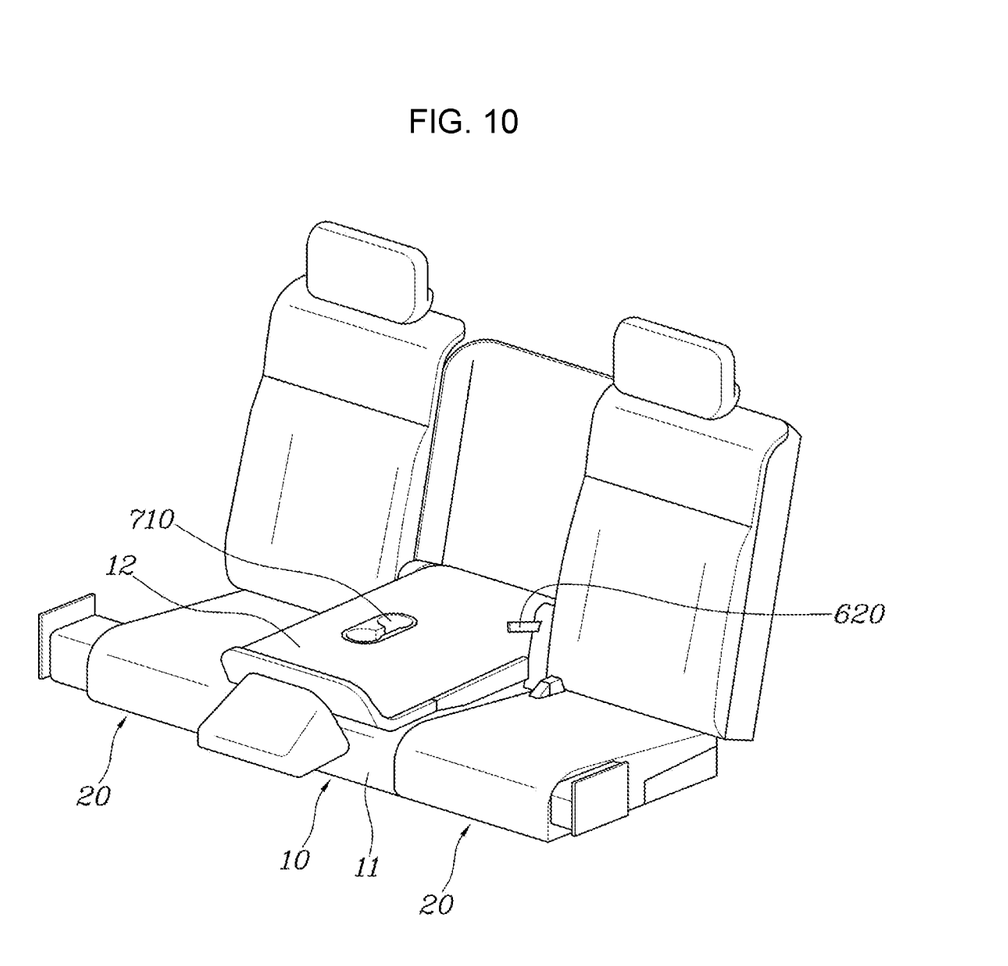
FIG. 10 is a view showing a forward folded back part of the center seat according to the present disclosure.

Furthermore, the back part 12 of the center seat 10 may be fully forward rotatable in operation of the recliner 610 as shown in FIG. 10, and when the back part 12 of the center seat 10 is folded, passengers on the side seats 20 may use the folded back part 12 as an armrest. Accordingly, the passenger of the side seats 20 can take good ride comfort.

Furthermore, as the back part 12 includes a cup holder 710 exposed outward when the back part 12 of the center seat 10 is folded, the passengers of the side seats 20 can use efficiently the cup holder 710.

As described above, according to the present disclosure, the rear seat for a vehicle may be seats for 3 passengers by using the center seat 10 and the side seats 20 located at left and right of the center seat and the center seat 10 may be configured to move forward with respect to the side seats 20 to protrude, and when the center seat 10 protrudes forward, a distance between the passengers can increase, so that physical contact between the passenger on the center seat 10 and the passengers on the side seats 20 can be prevented as much as possible, so that the comfortable seating condition of the rear passengers can be induced.

Furthermore, the rear seat for a vehicle according to the present disclosure is configured such that the back part 12 of the center seat 10 may be adjustable in longitudinal angle by operation of the recliner 610, and the forward folded back part 12 may be usable as the armrest, and the folded back part 12 may include the cup holder 710. Accordingly, the passengers of the side seats 20 can be provided a comfortable ride quality.

Although the preferred embodiment of the present disclosure has been disclosed in detail only with respect to the above specific embodiment, those skilled in the art will appreciate that various modifications, additions, and substitutions are possible, without departing from the spirit and scope of the present disclosure, and it is appropriate that the various modifications, additions, and substitutions belong to the accompanying claims.

What is claimed is:

1. A rear seat for a vehicle, the rear seat comprising:
a center seat, and a side seat located at left and right of the center seat,
wherein the center seat is configured to be movable with respect to the side seats by operation of a link device connecting a center seat cushion frame of the center seat to each of side seat cushion frames of the side seats; and
wherein the link device comprises at least one link, and the at least one link has opposite ends respectively coupled to the center seat cushion frame and each of the side seat cushion frames in a rotatable hinge structure.

2. The rear seat of claim 1 wherein when the center seat moves forward, the center seat protrudes forward with respect to the side seats.

3. The rear seat of claim 1, wherein the link device comprises a first link and a second link, and each of the first link and the second link has opposite ends respectively coupled to the center seat cushion frame and each of the side seat cushion frames in the rotatable hinge structure.

4. The rear seat of claim 3, wherein the first link and the second link are composed of a pair of first links and a pair of second links, and the pair of first links and the pair of second links are provided to connect left and right surfaces of the center seat cushion frame to the side seat cushion frames.

5. The rear seat of claim 3, wherein the first link and the second link are spaced apart from each other and provided in parallel to each other.

6. The rear seat of claim 1, further comprising:
latches provided at the center seat cushion frame; and
strikers provided at the side seat cushion frames and coupled to the latches,
wherein when the latches and each of the strikers are coupled to each other, back and forth movement of the center seat is impossible, and when coupling between the latches and each of the strikers is released, back and forth movement of the center seat is possible.

7. The rear seat of claim 6, wherein the latches comprise two latches and the two latches are respectively located at left and right portions of the center seat cushion frame, and the two latches are configured to be simultaneously operated.

8. The rear seat of claim 6, wherein the strikers comprise a front striker and a rear striker, which are transversally extended below the latches and connected to the side seat cushion frames; and the front striker and the rear striker are spaced apart from each other and provided in parallel to each other.

9. The rear seat of claim 8, wherein the front striker and the rear striker are longitudinally spaced apart from each other.

10. The rear seat of claim 8, wherein when the latches are coupled to the front striker, the center seat moves and protrudes forward with respect to the side seats.

11. The rear seat of claim 8, wherein when the latches are coupled to the rear striker, the center seat is prevented from protruding with respect to the side seats and is arranged on the same line as the side seats.

12. The rear seat of claim 7, further comprising:
a lever bracket fixed to the side seat cushion frames and an operating lever rotatably coupled to the lever bracket; and
a latch cable of which a first end is connected to the operating lever and second ends are connected to the two latches,
wherein when the operating lever rotates, the latch cable is pulled or relaxed, so that the latches are operated.

13. The rear seat of claim 12, wherein a strap is coupled to the operating lever so that a user pulls the strap to rotate the operating lever.

14. The rear seat of claim 12, further comprising:
a lever spring of which opposite ends are respectively coupled to the lever bracket and the operating lever to supply a restoration force to the operating lever.

15. The rear seat of claim 12, wherein, when the latch cable is pulled by rotation of the operating lever, locking between the latches and each of the strikers is released, and in releasing the locking, the center seat is movable backwards and forwards with respect to the side seats.

16. The rear seat of claim 1, wherein a cushion part and a back part of the center seat are connected to each other by a recliner as a medium, and back and forth angle adjustment of the back part is possible by operation of the recliner.

17. The rear seat of claim 16, wherein the back part of the center seat rotates forward in operation of the recliner to be folded; and when the back part of the center seat is folded, passengers on the side seats use the folded back part as an armrest.

18. The rear seat of claim 17, wherein the back part comprises a cup holder that is exposed upward when the back part is folded.

19. The rear set of claim 16, wherein the operation of the recliner is performed by operating a recliner lever, and the recliner lever protrudes forward from the center seat.

20. A vehicle comprising the rear seat of claim 1.

21. A rear seat for a vehicle, the rear seat comprising:
a center seat, and a side seat located at left and right of the center seat,
wherein the center seat is configured to be movable with respect to the side seats by operation of a link device connecting a center seat cushion frame of the center seat to each of side seat cushion frames of the side seats; and
wherein the rear seat further comprises:
latches provided at the center seat cushion frame; and
strikers provided at the side seat cushion frames and coupled to the latches,
wherein when the latches and each of the strikers are coupled to each other, back and forth movement of the center seat is impossible, and when coupling between the latches and each of the strikers is released, back and forth movement of the center seat is possible.

\* \* \* \* \*